United States Patent [19]
Koga

[11] Patent Number: 5,261,809
[45] Date of Patent: Nov. 16, 1993

[54] BLOW MOLDING APPARATUS VARYING PITCH BETWEEN HOLDING PLATE ROWS

[75] Inventor: Kouhei Koga, Ueda, Japan

[73] Assignee: Nissei ASB Machine Co., Ltd., Nagano, Japan

[21] Appl. No.: 919,945

[22] Filed: Jul. 27, 1992

[30] Foreign Application Priority Data

Jul. 30, 1991 [JP] Japan .................. 3-214731

[51] Int. Cl.⁵ .............................. B29C 49/56
[52] U.S. Cl. ................. 425/451.5; 425/522; 425/533; 425/534; 425/541
[58] Field of Search ......... 425/522, 523, 532–534, 425/541, 451.5, 450.1, 451.9

[56] References Cited

U.S. PATENT DOCUMENTS

| | | | |
|---|---|---|---|
| 2,864,124 | 12/1958 | Strauss | 425/534 X |
| 3,048,890 | 8/1962 | Soubier | 425/534 X |
| 3,449,481 | 6/1969 | Tahara | 425/541 X |
| 3,790,318 | 2/1974 | Marfiewicz | 425/532 |
| 3,819,314 | 6/1974 | Marcus | 425/534 X |
| 3,854,855 | 12/1974 | Pollock et al. | 425/541 X |
| 4,321,029 | 3/1982 | Aoki | 425/523 |
| 4,370,121 | 1/1983 | Valyi | 425/534 X |
| 5,169,654 | 12/1992 | Koga | 425/522 |

FOREIGN PATENT DOCUMENTS

| | | |
|---|---|---|
| 0435347 | 7/1991 | European Pat. Off. |
| 2389580 | 12/1978 | France. |
| 61-125833 | 6/1986 | Japan .................. 425/534 |
| 63-116830 | 5/1988 | Japan. |
| 1-18847 | 4/1989 | Japan. |
| 3-32354 | 2/1991 | Japan. |

*Primary Examiner*—Richard L. Chiesa
*Attorney, Agent, or Firm*—Oliff & Berridge

[57] ABSTRACT

A blow molding apparatus having two rows of holding plates each for holding a plurality of preforms; supporting and conveying means for conveying the two rows of holding plates into a blow molding station while slidably supporting the holding plates so that the row pitch in the rows is variable; two rows of blow molds arranged in the blow molding station corresponding to the two rows of holding plates, each row of the blow molds being adapted to blow mold the preforms; and a linkage for changing and setting the row pitch in the rows of holding plates. The linkage includes two first support shafts arranged respectively on the opposite end faces of the two rows of holding plates in a direction perpendicular to the direction of the pitch; two first links each rotatably supported around the corresponding one of the first support shafts; and two second support shafts each for rotatably supporting the other end of the corresponding one of the first link in the coaxial or non-coaxial manner, whereby the row pitch of the holding plate rows can be changed by the vertical movement of the second support shafts.

19 Claims, 12 Drawing Sheets

BLOW MOLDING APPARATUS VARYING PITCH BETWEEN HOLDING PLATE ROWS

BACKGROUND OF THE INVENTION

1. Field of the Invention

The present invention relates to a blow molding apparatus varying pitch between two rows of holding plates for holding a preform or final molding.

2. Description of the Related Art

Figure 12:
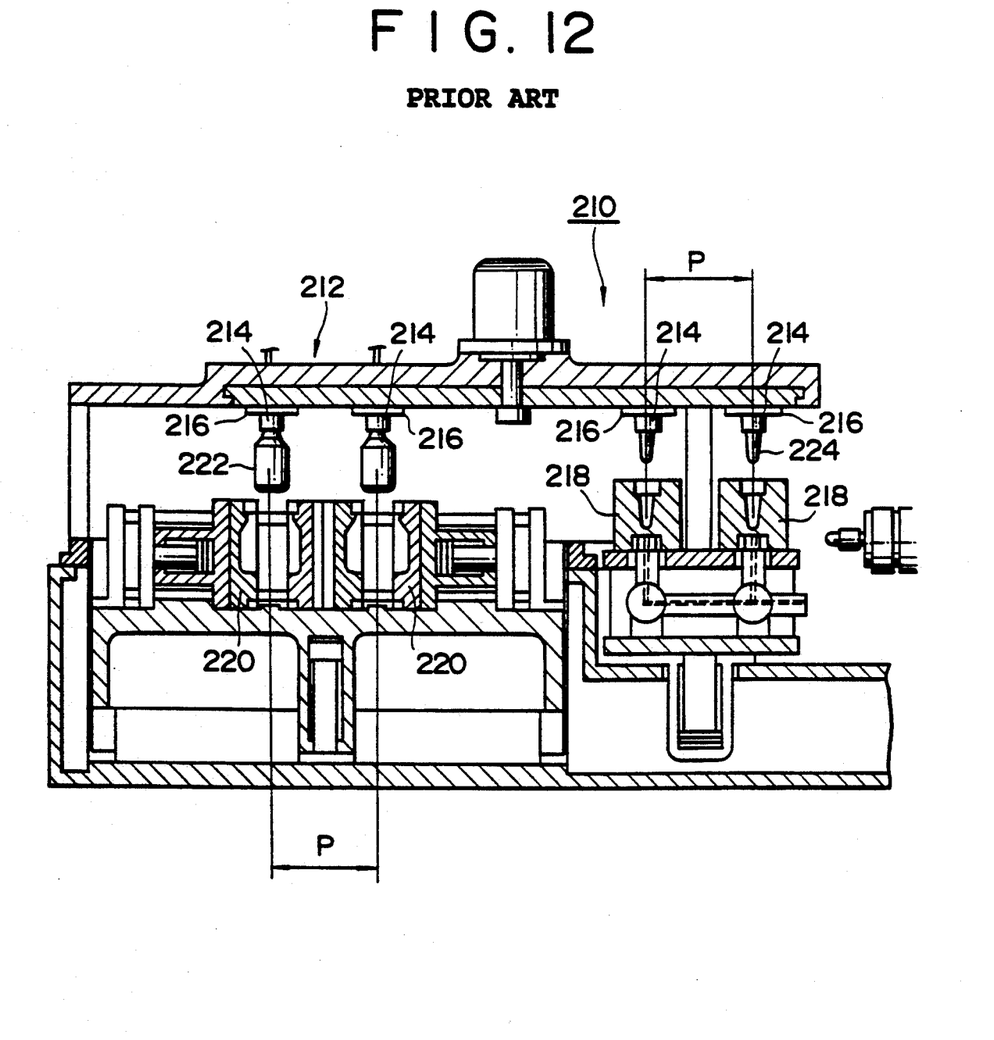
FIG. 12 is a schematic view of a prior art apparatus having a fixed row pitch.

In the past, a so-called one-stage molding apparatus produces a hollow vessel by moving a preform through injection molding, blow molding and releasing steps while the preform is held by a lip mold at the lip portion thereof. If a number of hollow vessels are to be molded through one cycle, two rows of neck mold holding plates are used with two corresponding rows of blow molds, as described in Japanese Patent Publication No. Hei 1-18847 (or U.S. Pat. No. 4,321,029). FIG. 12 is a cross-sectional view of the prior art system comprising an injection molding station 210 for injection molding a preform 224 and a blow molding station 212 for stretch blow molding a final product 222. Two rows of holding plates 216 for holding a lip mold 214 are disposed spaced apart from each other with a pitch P. For such a pitch P, two sets of injection cavity molds 218 are disposed in the preform injection molding station 210 and two sets of blow molds 220 are arranged in the blow molding station 212.

In such an arrangement, however, the pitch P must be relatively large, leading to increase of the entire system size.

This is because the pitch P must be determined in consideration of the release in the blow molding station 212. More particularly, the pitch P is required to be larger than two times the thickness of an inner split blow mold half 220a plus the movement of the mold on releasing or the maximum diameter of a vessel 222 to be molded. The thickness of the inner split blow mold half 220a must be selected so that it will not flex under a predetermined internal pressure (blow pressure). Thus, the thickness of the inner split blow mold half 220a plus a holding plate (not shown) attached to the back thereof will be increased. This forces the pitch P to be increased.

Japanese Patent Laid-Open No. Sho 61-125833 discloses a one-stage molding apparatus comprising two rows of holding plates, the row pitch being variable. The row pitch is decreased before and after the injection molding station. In the other stations, the row pitch is then increased into a magnitude required in the blow molding station. Therefore, the entire molding apparatus could be small-sized only into a limited level.

In U.S. patent application Ser. No. 07/634,079 U.S. Pat. No. 5,169,654 or Europe Patent Application No. 90/25770.9, the inventors have proposed blow molding process and apparatus which utilize two rows of preform holding plates and which can provide a small-sized structure by changing the row pitch in a blow molding station while increasing the number of moldings through one molding cycle.

SUMMARY OF THE INVENTION

It is therefore an object of the present invention to provide a blow molding apparatus which comprises two rows of holding plates and which can reliably change the row pitch through a simplified mechanism.

Another object of the present invention is to provide a blow molding apparatus of the above type which further comprises a clamping/releasing device capable of saving the necessary space.

To this end, the present invention provides a blow molding apparatus comprising:

two rows of holding plates each for holding a plurality of preforms;

supporting and conveying means for conveying said two rows of holding plates into a blow molding station while slidably supporting said holding plates so that the row pitch between said holding plate rows is variable;

two rows of blow molds arranged in said blow molding station corresponding to said two rows of holding plates, each row of said blow molds being adapted to blow mold the preforms into hollow articles; and a linkage for changing and setting the row pitch of holding plate rows, said linkage comprising:

two first support shafts arranged respectively on the opposite end faces of the two rows of holding plates in a direction perpendicular to the direction of said pitch;

two first links each rotatably supported at one end around the corresponding one of said first support shafts; and two second support shafts each for rotatably supporting the other end of the corresponding one of said first links in the coaxial or non-coaxial manner, whereby the row pitch of said holding plate rows can be changed by the vertical movement of said second support shafts.

In accordance with the present invention, the two rows of preform holding plates are slidably supported by the supporting and conveying means so that the row pitch is variable, and conveyed into the blow molding station having two rows of blow molds by the supporting and conveying means. For example, the two rows of holding plates are set at a decreased row pitch during a period from a time when the holding plates are conveyed into the blow molding station to another time when the blow molding step is terminated. When the blow molds are opened, the row pitch is changed into an increased value. This is performed by the row pitch changing and setting linkage.

When the second support shafts are vertically moved by any external force, the row pitch changing and setting linkage can easily change the row pitch in the two rows of holding plates from one to another. The two rows of holding plates are normally maintained to have a row pitch by biasing means. The biasing means is preferably located to set the two rows of holding plates at a decreased row pitch. The two rows of holding plates can be set at an increased row pitch by exerting an external force against the biasing force of the biasing means to the two rows of holding plates. If the increased row pitch is set to be one that the two first links are substantially set along a straight line, the increased row pitch can be maintained even when the external force is removed.

When the blow molding apparatus comprises a guide rod provided for movement with each second support shaft and an opening for guiding the movement of the guide rod in the vertical direction, the second support shaft can be vertically driven without center-off to provide a proper force for changing the row pitch.

When the blow molding station comprises positioning means for maintaining the guide rod at such a height that the two rows of holding plates are set with the maximum row pitch, the latter can be reliably maintained even if any undesirable external force acts on the two rows of holding plates.

The supporting and conveying means can convey the two rows of holding plates from the blow molding station to the subsequent or ejecting station while maintaining the two rows of holding plates at the increased row pitch. Preferably, the ejecting station includes a pitch changing mechanism for changing the two rows of holding plates from the increased row pitch to the decreased row pitch after hollow blow molded products have been ejected from the two rows of holding plates. In the increased row pitch, there can be easily ensured a space necessary to make the ejection between two rows of holding plates. In other words, the decreased row pitch can be minimum when the space required in the ejection is not required in the decreased row pitch.

In an preferred embodiment of the present invention, the blow molding apparatus comprises two rows of blow molds formed by two first mold halves fixedly mounted opposite to each other and two second mold halves each arranged opposite to the corresponding first mold half and movable toward and away from the first mold half. Preferably, the two rows of blow molds comprise a row pitch changing linkage for raising the second support shafts in association with the opening of the second mold halves. The row pitch changing linkage comprises two third support shafts movable with the two second mold halves, two second links each rotatably supported at one end around the corresponding one of the third support shafts and fourth support shafts that rotatably support the other end of the corresponding second links in coaxial or noncoaxial manner. When the two second mold halves are opened, the fourth support shafts are raised to raise the second support shafts. As a result, the row pitch in the two rows of holding plates will be increased.

When the two rows of blow molds are formed by two first mold halves fixedly mounted opposite to each other and two second mold halves each arranged opposite to the corresponding first mold half and movable toward and away from the first mold half, a second mold half clamping/releasing device preferably comprises first and second clamping plates each fixedly mounted on the respective one of the two second mold halves on the opposite sides of the two first mold halves fixedly arranged opposite to each other; a drive plate disposed outside the first clamping plate; a clamp shaft fixedly mounted at one end on said drive plate, the other end of said clamp shaft extending through said first clamping plate and fixedly connected to the second clamping plate; a drive mechanism for driving said drive plate and first clamping plate to change the distance therebetween and to open and close the first and second clamping plates. In such an arrangement, only a single drive mechanism may be disposed for one of the two blow molds. This results in saving of the necessary space.

DETAILED DESCRIPTION OF THE PREFERRED EMBODIMENTS

One embodiment of a blow molding apparatus constructed in accordance with the present invention will now be described in detail with respect to the drawings.

Figure 8:
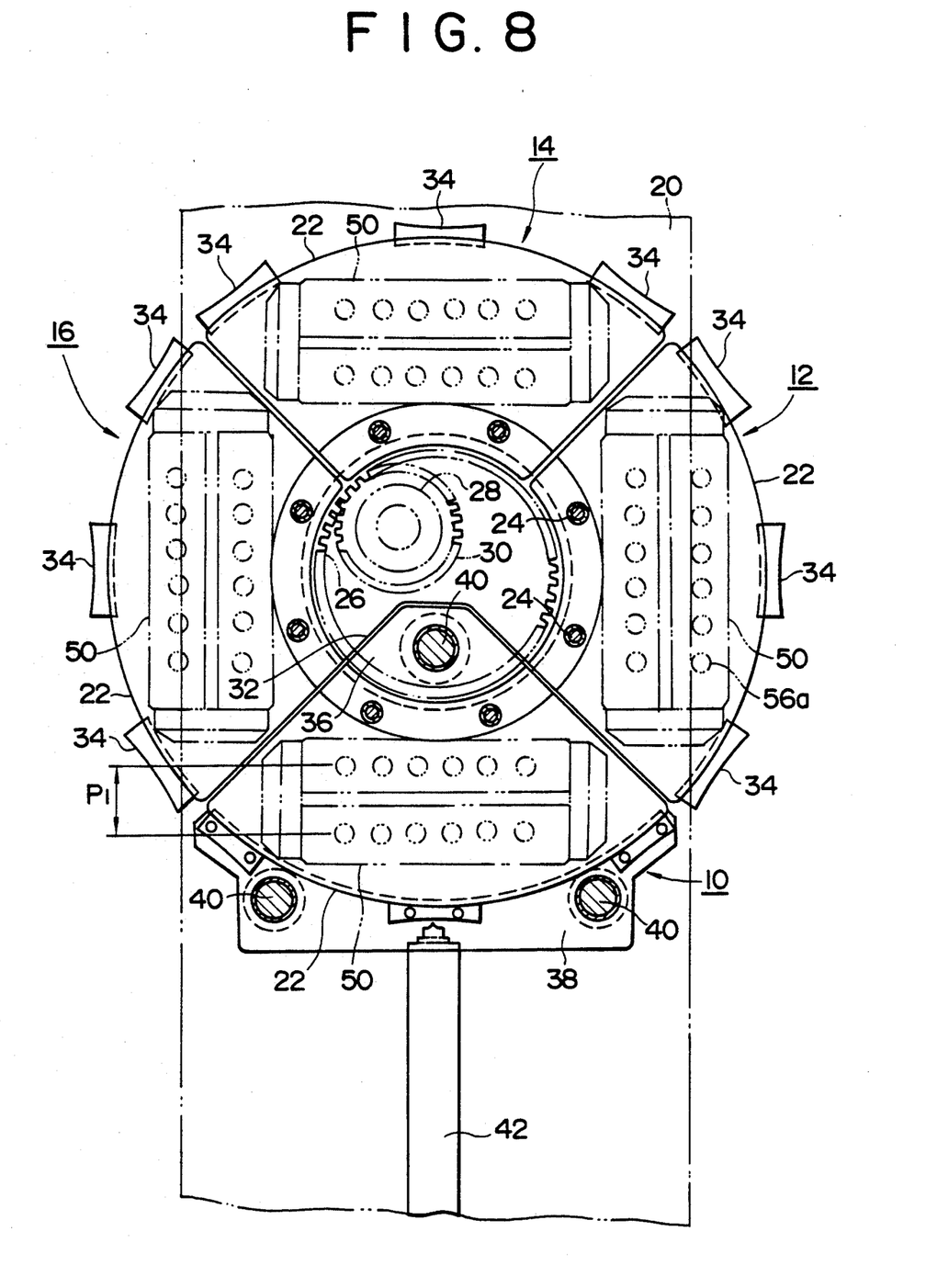
FIG. 8 is a plan view showing the overall arrangement of the apparatus of the present invention.

Referring first to FIG. 8, there is shown a rotary type blow molding apparatus of the present invention, which comprises one stage including four stations, that is, an injection molding station 10, a temperature regulating station 12, a blow molding station 14 and an ejecting station 16. The temperature regulating station may be omitted, if desired. Furthermore, the present invention may be similarly applied to two-stage blow molding apparatus which comprises a first stage including an injection molding station and a second stage including a temperature regulating station, a blow molding station and an ejecting station.

As shown in FIG. 8, the blow molding apparatus comprises a bed 20, an upper base (not shown) above the bed 20 and four rotary segments 22 rotatably mounted below the upper base. Each of the rotary segments 22 extends substantially through 90 degrees such that it can be coincide with the respective one of the stations 10-16. The underside of each of the rotary segments 22 supports two rows of holding plates 50 which will be described later. Each of the rotary segments 22 is fixedly mounted on an annular gear wheel 26 through connecting shafts 24. The gear wheel 26 is engaged by a drive gear 30 which is fixedly mounted on the output shaft of a drive 28. When the drive 28 is intermittently actuated, the respective rotary segments 22 are sequentially moved to the respective stations through each 90 degrees.

An inner edge receiving member 32 for rotatably supporting the undersides of three rotary segments 22 at their inner edges is provided to extend along three stations 12-16 except the injection molding station 10. The underside of each of the three rotary segments is also rotatably supported at its outer edge by three outer edge receiving members 34. On the other hand, the injection molding station 10 having an injection apparatus 42 is adapted to support the rotary segment 22 for vertical movement and comprises movable inner and outer edge receiving member 36, 38 which support the rotary segment 22 placed in the injection molding station 10 for rotational and vertical movements. The injection molding station 10 further includes three movable tie bars 40 located at positions corresponding to three apexes of the substantially triangular configuration of the segment 22 which is placed in the injection molding station 10. These tie bars 40 will not be further described herein since they are described in detail in Japanese Patent Application No. Hei 3-32354 which has been filed by the same applicant. A mold clamping device and others will not be also described herein since they are described in Japanese Patent Laid-Open No. Sho 63-116830.

A row pitch changing mechanism for two rows of holding plates 50 by which the present invention is characterized will be described with respect to FIGS. 1-5.

Figure 3:
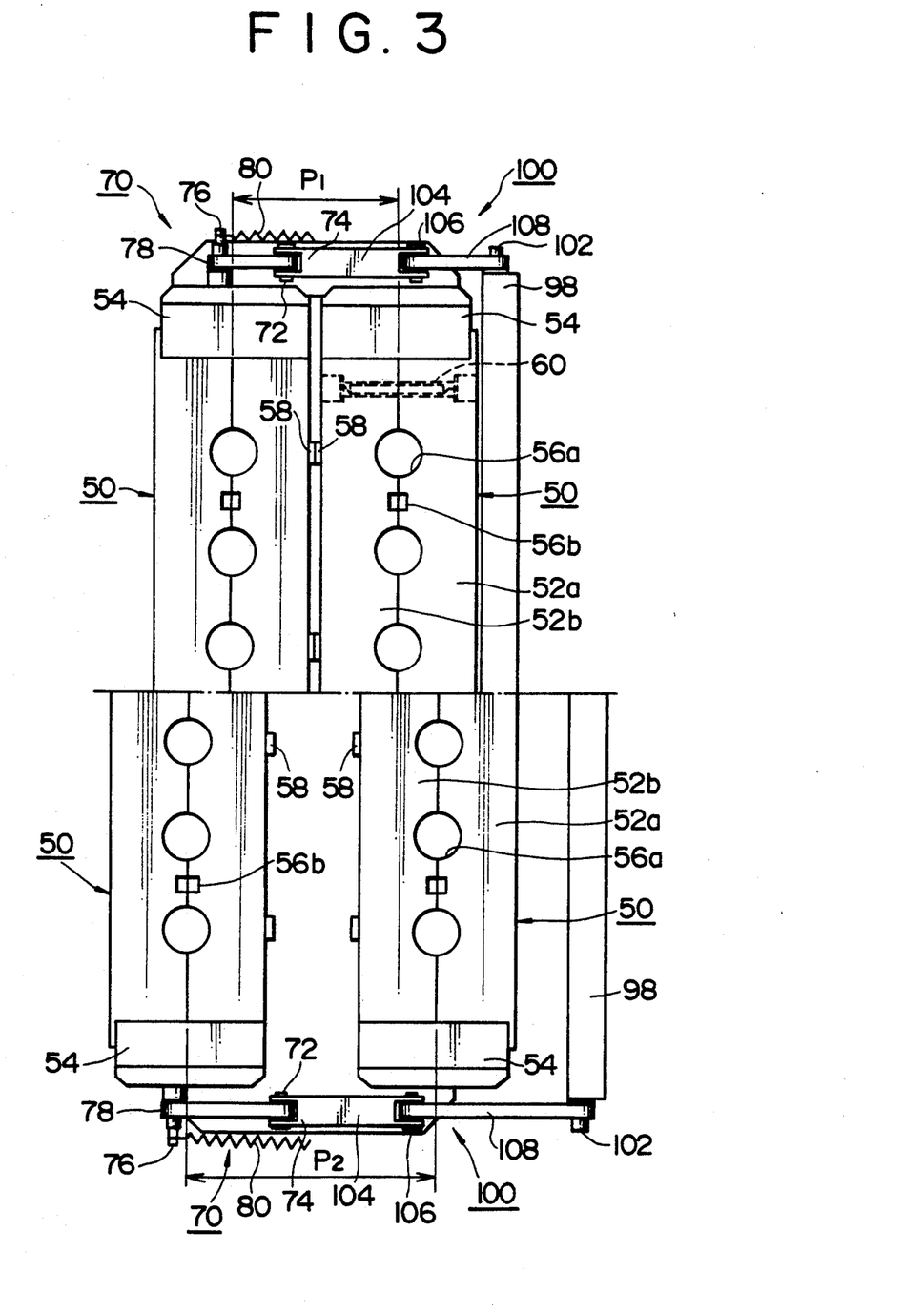
FIG. 3 is a plan view of two rows of holding plates, the upper half showing the two rows of holding plates set at a first row pitch and the lower half showing their second row pitch.

As shown in FIG. 3, each of the rotary segments 22 carries two rows of holding plates juxtaposed relative to each other. Each of the holding plates 50 comprises a pair of plate portions 52a, 52b and guide members 54 located on each of the plate portions 52a or 52b at the opposite ends and supporting the plate portion 52a or 52b to secure the ejecting function. Each pair of plate portions 52a, 52b includes a plurality of lip mold mounting apertures 56a (e.g. six) on each of which a lip mold 64 (see FIG. 4) is mounted, and notches 56b used in the ejection driving operation. Positioning pieces 58 are formed on the inner plate portion of each pair of plate portions 52a, 52b. When the two rows of holding plates 50 are moved toward each other, the positioning pieces 58 on the opposed side faces of the inner plate portions in the two rows of holding plates 50 can be engaged by each other to set a first or minimum row pitch P1 in the two rows of holding plates 50. Each pair of plate portions 52a, 52b is biased to their closed position by means of coil springs 60.

Figure 2:
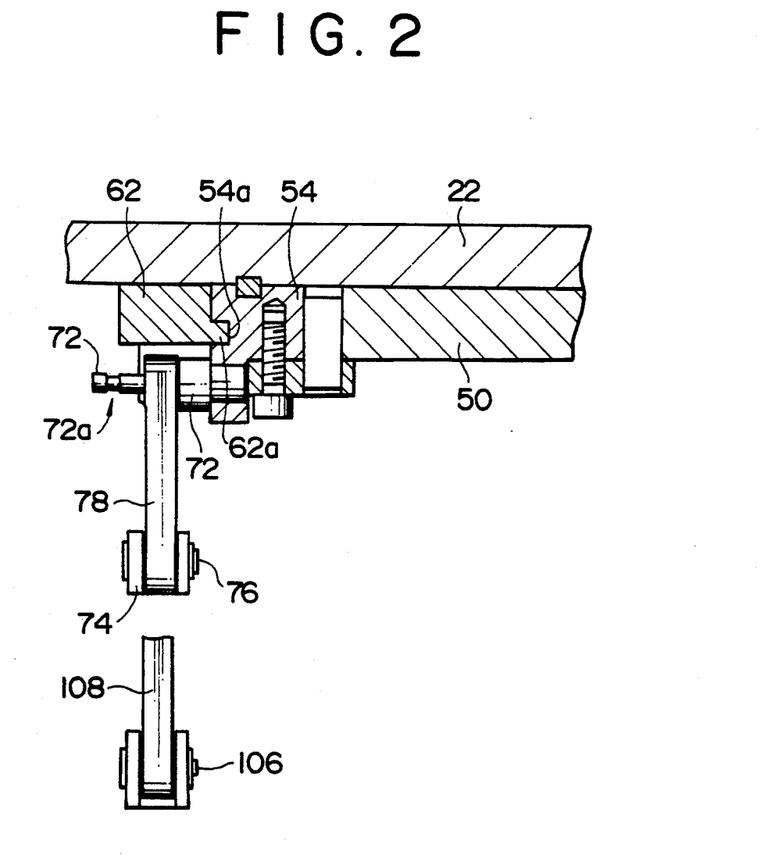
FIG. 2 is a cross-sectional view of the apparatus, taken along a line I—I in FIG. 1.

As shown in FIG. 2, each of the rotary segments 22 includes a pair of spaced rail members 62 fixedly mounted on the underside thereof. Each of the rail members 62 includes a protrusion 62a formed therein, extending inwardly from the inner side thereof and longitudinally along the length of the rail member. Each of the protrusions 62 engages in a groove 54a formed in the corresponding guide member 54 at its outer end face. As a result, the two rows of holding plates 50 are slidable along the rail members 62 to change the row pitch.

A row pitch changing and setting linkage 70 for changing the row pitch of the two rows of holding plates 50 will be described with respect to FIG. 1.

The linkage 70 comprises two first support shafts 72 extending outwardly from the two guide members 54, a first connecting plate 74 positioned parallel to the guide member 54, two second support shafts 76 on the opposite ends of the first connecting plate 74, and two first links 78 each rotatably supported at the opposite ends by the first and second support shafts 72, 76. Although this embodiment has been described as having two second support shafts 76 connected to the first connecting plate 74 at the opposite ends, that is, in a noncoaxial manner, the two first links 78 may be rotatably supported by a single second support shaft 76 in a coaxial manner. In the illustrated embodiment, two of such linkages 70 are provided for two rows of holding plates 50 at the opposite ends as viewed in the longitudinal direction. Each of the first support shafts 72 includes a circumferential latch groove 72a formed therein adjacent the outer end of the support shaft 72 (see FIG. 2). A coil spring 80 is spanned between the first support shafts 72 with the opposite ends engaging in the respective grooves 72a. As a result, the two lines of holding plates 50 are biased toward each other to have a decreased row pitch or first row pitch P1. A guide rod 82 is fixedly mounted on the first connecting plate 74 and extends vertically and upwardly therefrom. In order to secure the vertical movement of the guide rod 82, the latter passes through guide apertures 22a, 62b which are formed through the rotary segment 22 and rail member 62, respectively.

Figure 4:
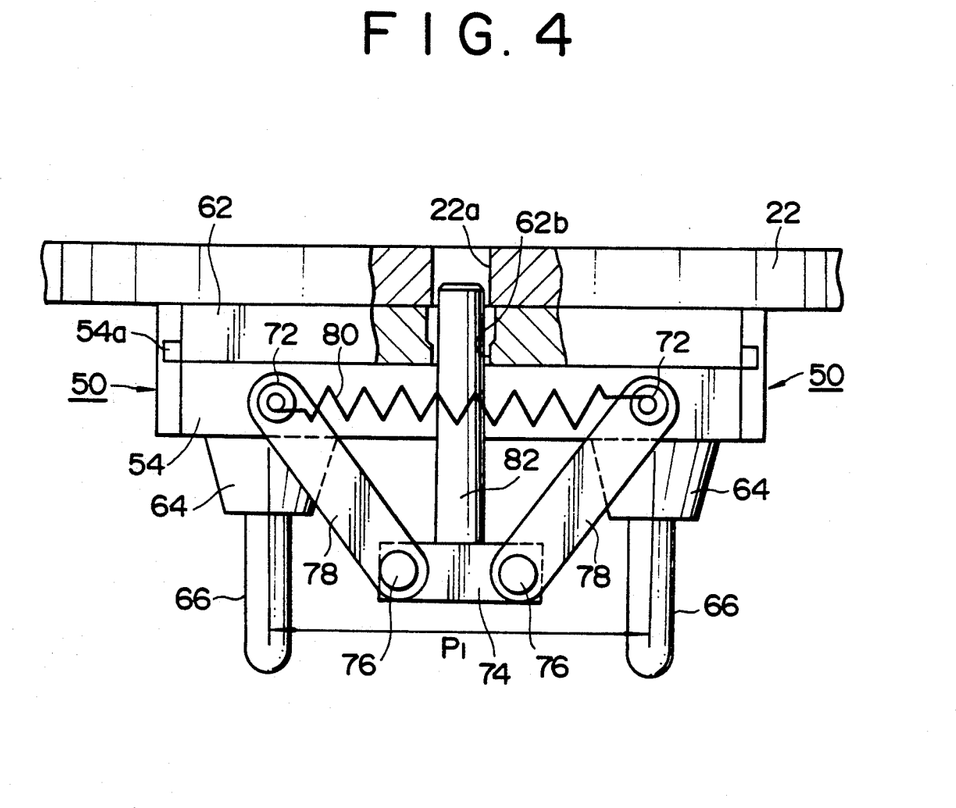
FIG. 4 is a schematic view illustrating the first row pitch P1 in the two rows of holding plates.

FIG. 4 shows that the two rows of holding plates 50, which support lip molds 64 and are set with the first row pitch P1 by the coil spring 80. Under such a condition, the two rows of holding plates 50 are conveyed into the injection molding station 10 wherein preforms 66 are injection molded with the row pitch being maintained at the first row pitch P1 and supported by the lip molds 64. The two rows of holding plates 50 are then conveyed into the temperature regulating station 12 by the intermittent movement of the rotary segments 22. In the temperature regulating station, the molded preforms are regulated in temperature and thereafter moved to the blow molding station 14.

Figure 1:
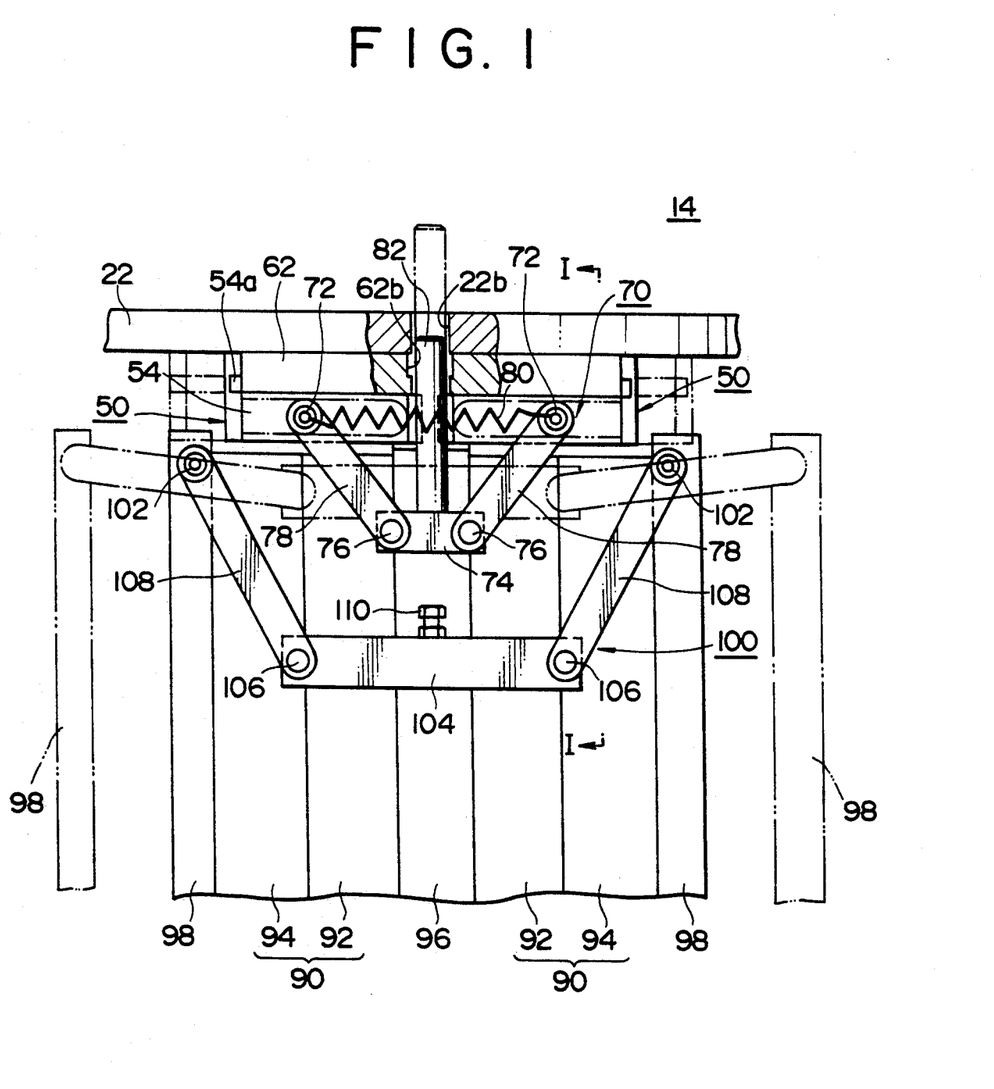
FIG. 1 is a schematic view of the primary parts of an apparatus constructed in accordance with the present invention.
Figure 5:
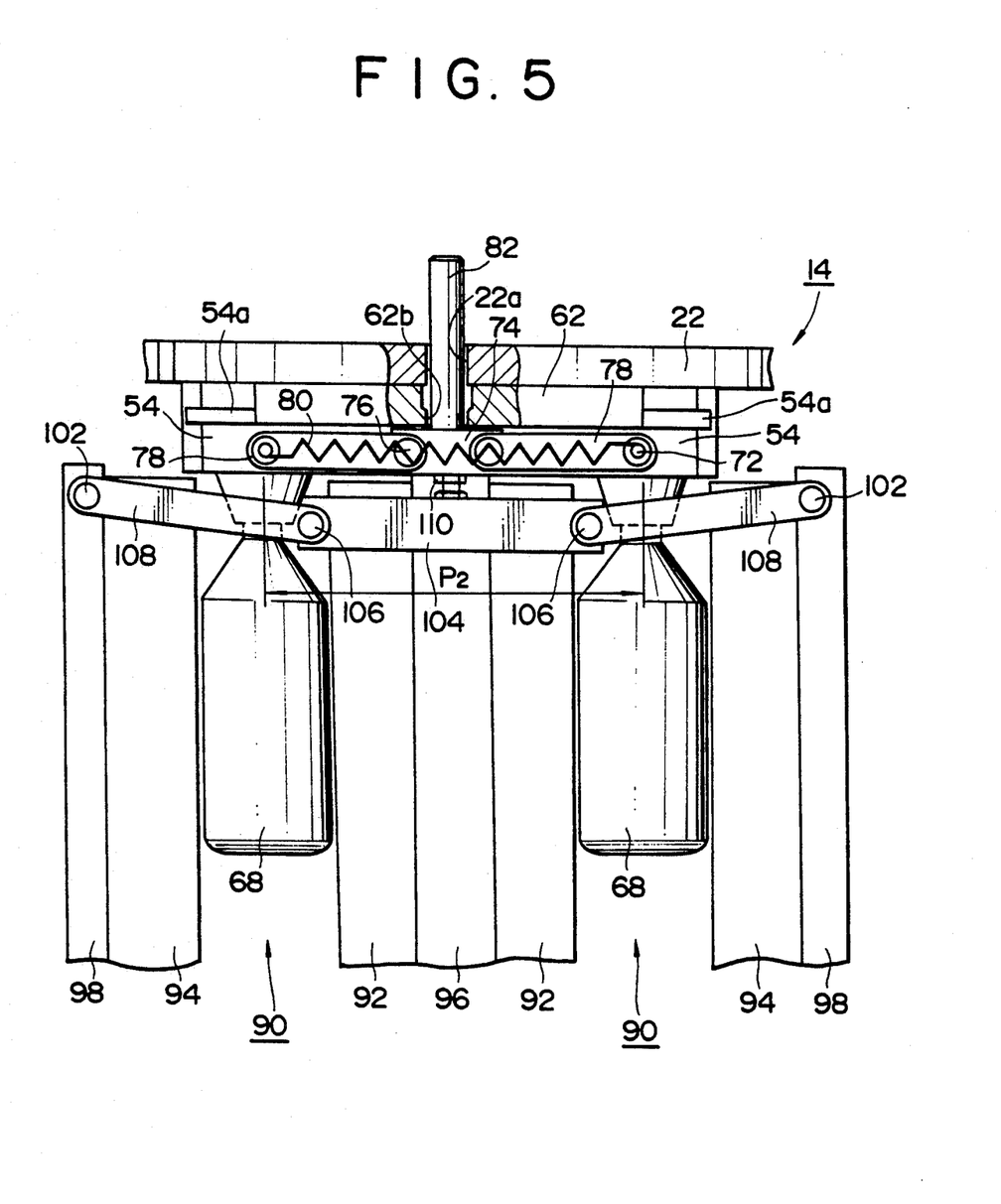
FIG. 5 is a schematic view illustrating the second row pitch P2 in the two rows of holding plates.

The reason why the row pitch of the two rows of holding plates 50 is changed from the first row pitch P1 to a second row pitch P2 is based on the following arrangement of two rows of blow molds 90 as shown in FIGS. 1 and 5.

Each of the blow molds 90 comprises first and second mold halves 92, 94 which defines cavity surfaces along the external configuration of a final molding (e.g. bottle) 68. The blow molding station 14 comprises a central mold halves fixing plate 96 and movable clamping plates 98 arranged at the opposite sides of the central mold halves fixing plate 96. Two first mold halves 92 of the two lines of blow molds 90 are fixedly mounted on the central mold halves fixing plate 96 at the opposite sides thereof. However, the first mold halves 92 may be directly connected opposite with each other or may be integrally formed into a single unit. On the other hand, two second mold halves 94 are fixedly mounted on the respective clamping plates 98 disposed on the opposite sides of the two rows of blow molds 90 such that each of the second mold halves 94 faces the corresponding first mold half 92 and is movable toward and away from the first mold half 92 for clamping and releasing. In such an arrangement, it is required that two rows of preforms 66 are set at the first row pitch P1 during the blow molding step and that the bottles 68 are set at the second row pitch P2 when they are to be removed after the blow molding step. The blow molding station 14 further comprises a row pitch changing linkage 100 for changing the row pitch of the two rows of holding plates 50 in association with the opening of the two rows of blow molds 90.

The linkage 100 comprises two third support shafts 102 respectively fixedly mounted on the clamping plates 98; a second connecting plate 104 positioned parallel to the first connecting plate 74 of the linkage 70; two fourth support shafts 106 formed on the second connecting plate 104 at the opposite ends; and two second links 108 each pivotally connected at the opposite ends to the corresponding third and fourth support shafts 102, 106. As in the second support shafts 76 of the linkage 70, the fourth support shafts 106 of the linkage 100 may be connected to each other in a concentric manner. As in the linkage 70, the linkage 100 defines a parallel link mechanism which causes the second connecting plate 104 to move upwardly in association with the opening of the blow molds 90. The second connecting plate 104 includes an urging projection 110 on the top edge thereof. When the second connecting plate 104 is moved upwardly, the urging projection 110 will engage the first connecting plate 74 to move it upwardly. As a result, the first connecting plate 74 will substantially overlap the two first links 78 in the linkage 70 to set the row pitch of the two rows of holding plates 50 at the second row pitch P2.

The changing of the row pitch in the blow molding station 14 will be described with reference to FIG. 6 in which the spring 80 is omitted for clarification.

Figure 6A:
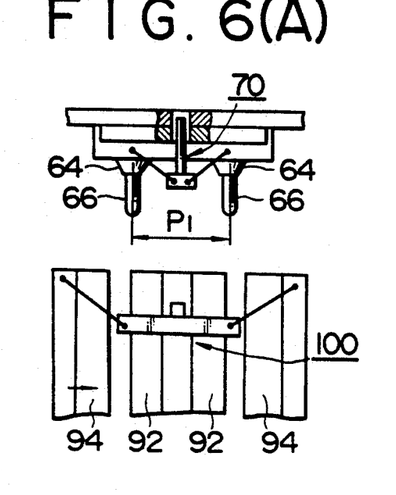
FIGS. 6A to 6E illustrate the changes of the row pitch in the blow molding station.
Figure 6B:
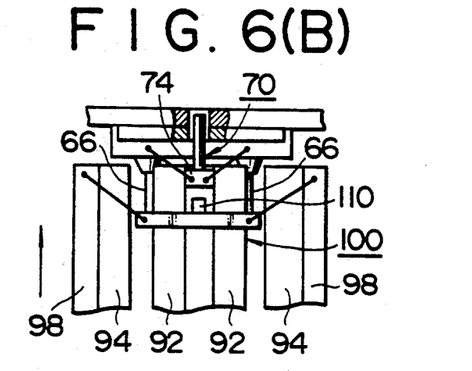
Figure 6C:
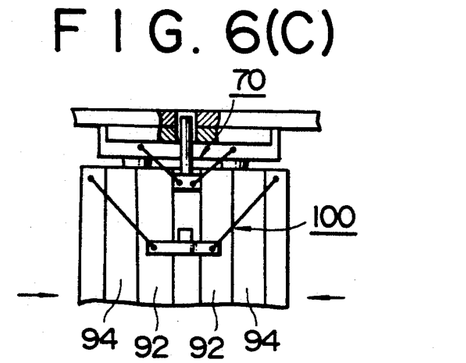

FIG. 6A shows two rows of holding plates 50 which has conveyed into the injection mold station 14. At this time, the row pitch of the two rows of holding plates 50 has been set at the decreased or first row pitch P1 under the action of the coil spring 80. As shown in FIG. 6B, thereafter, the two rows of blow molds 90 are moved upwardly as by means of a hydraulic drive in such an opening state that they will not interfere with preforms 66 (not completely opening state). Thus, the blow molds 90 will be disposed at positions surrounding two rows of preforms 66. At this time, the urging projection 110 of the linkage 100 will not upwardly move the first connecting plate 74 of the linkage 70. Subsequently, the clamping plates 98 are moved inwardly to complete the clamping in the two rows of blow molds 90, as shown in FIG. 6C. Under such a condition as shown in FIG. 6C, the preforms 66 can be biaxialstretch blow molded into bottles 68 by longitudinally stretching the preforms through the stretching rod and also by laterally stretching them through pressurized air which is introduced into the blow molds 90.

Figure 6D:
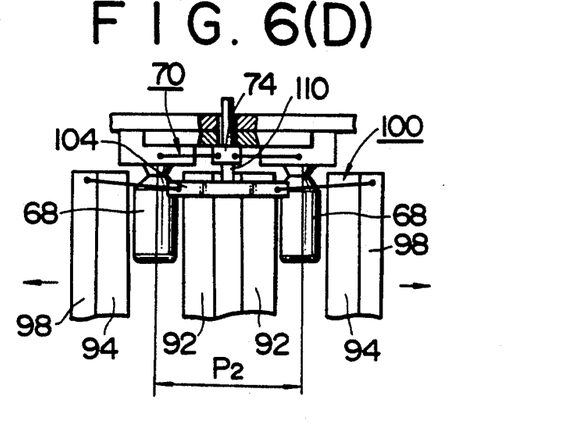
Figure 6E:
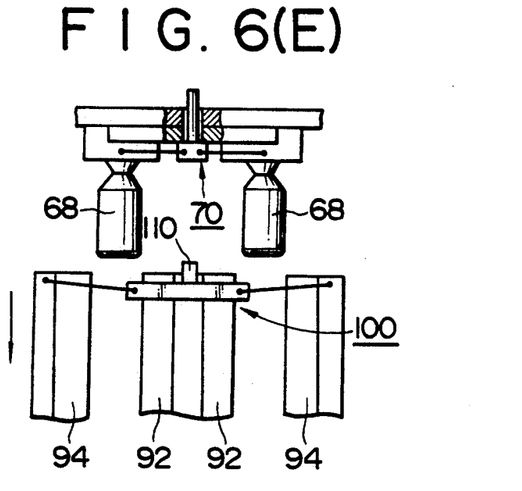

FIG. 6D shows the opening of the two rows of blow molds 90. When the clamping plates 98 are laterally moved away from each other, the second connecting plate 104 of the linkage 100 is moved upwardly. The urging projection 110 on the second connecting plate 104 engages the first connecting plate 74 of the linkage 70 to move it upwardly. Under the action of the parallelogram linkage 70, the row pitch of the two rows of holding plates 50 will be similarly set at the second row pitch P2 against the action of the coil spring 80. Thereafter, the two rows of blow molds 90 are moved downwardly to complete the removal of the bottles 68 from the blow molds 90, as shown in FIG. 6E. The second row pitch P2 can be maintained against the action of the coil spring 80 since the first connecting plate 74 substantially linearly overlaps the two first links 78 in the linkage 70 even if the urging projection 110 is separated from the first connecting plate 74.

Figure 7A:
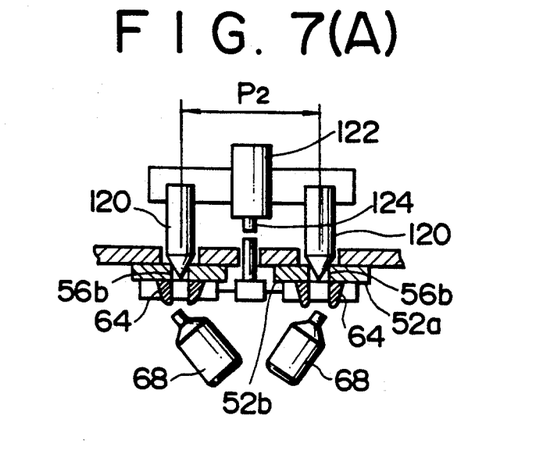
FIGS. 7A to 7C illustrate the ejection and row pitch change operations in the ejection station.
Figure 7B:
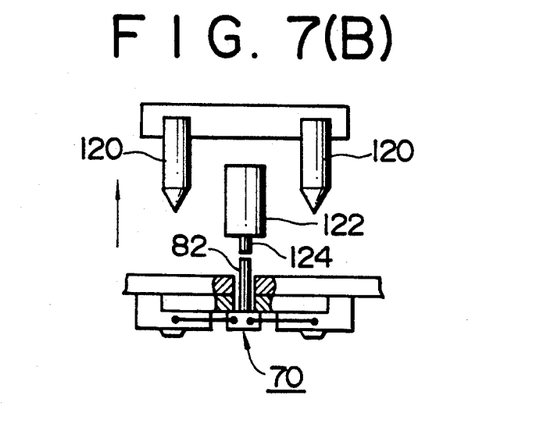

The ejection and row pitch changing in the ejecting station 16 will be described with reference to FIG. 7.

The ejecting station 16 comprises two rows of ejection drive plates 120 arranged above the rotary segments 22 for vertical movement with the second row pitch P2, and a cylinder 122 fixedly mounted for driving an extendible rod 124 above the guide rod 82. Each of the ejection drive plate 120 has its lower wedge-shaped portion which can extend into the corresponding notch 56b in each row of holding plate 50 to move the pair of plate portions 52a, 52b in that holding plate 50 away from each other.

Referring again to FIG. 7, the two rows of holding plates 50 are conveyed into the ejecting station 16 while they are maintained at the second row pitch P2. The two rows of ejection drive plates 120 arranged with the second row pitch P2 are then moved downwardly to cause the wedge-shaped portions thereof to extend into the notches 56b of the holding plates 50. This enables each lip mold 64 consisting of mold halves respectively fixed to the pair of plate portions 52a, 52b to be opened, as shown in FIG. 7A. Thus, a molded bottle 68 can be removed from the corresponding lip mold 64 to complete the ejection drive. As shown in FIG. 7B, thereafter, the two rows of ejection drive plates 120 are moved upwardly to close the pair of plate portions 52a, 52b under the action of the coil spring 60. Since the ejection drive is performed under a condition that the two rows of holding plates 50 are maintained at the increased or second row pitch P2, it is not required to secure an additional space for the ejection drive between the two rows of holding plates 50 when the decreased or first row pitch P1 is to be determined. As a result, the first row pitch P1 can be decreased to reduce the size of the system.

Figure 7C:
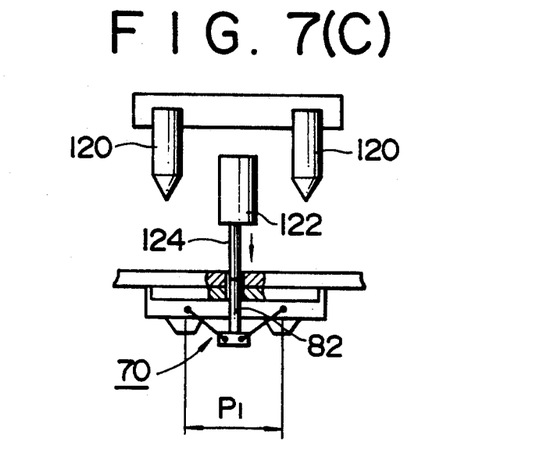

As shown in FIG. 7C, the cylinder 122 is then actuated to extend the extendible rod 124 thereof such that the guide rod 82 are moved downwardly. Thus, the first connecting plate 74 to which the guide rod 82 is secured is moved downwardly to actuate the parallelogram linkage 70 so that the row pitch in the two rows of holding plates 50 will be reset at the decreased or first row pitch P1. Therefore, the two rows of holding plates 50 are returned back to the injection molding station 10 to complete one molding cycle while maintaining the first row pitch P1 therein.

Although the present invention has been described as to one embodiment, it may be applied to various modifications and changes within the scope of the invention.

Figure 9A:
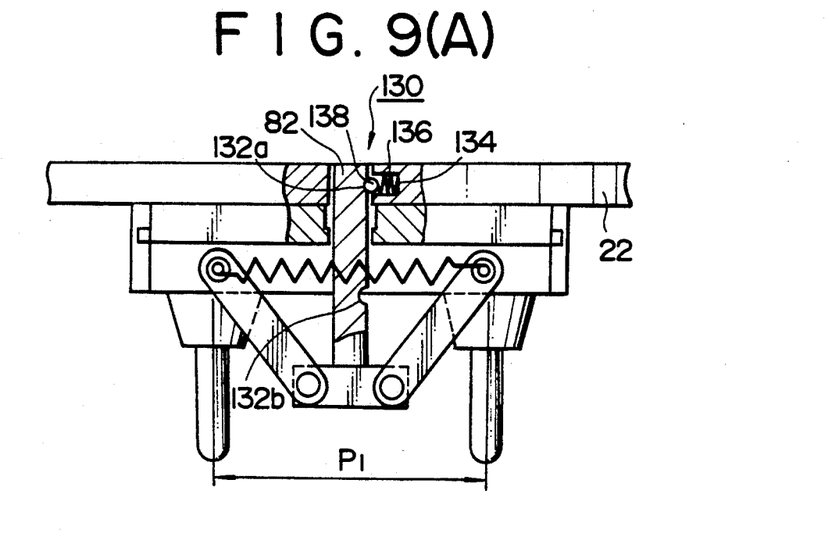
FIGS. 9A and 9B illustrate a detent mechanism for setting and maintaining the second row pitch P2.
Figure 9B:
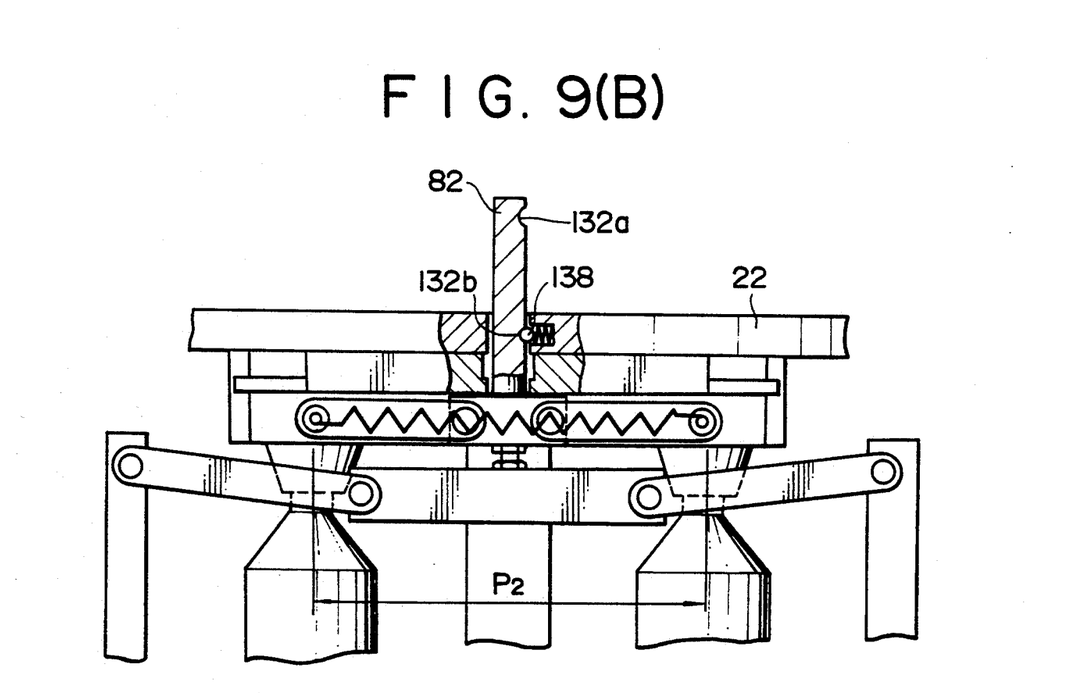

FIG. 9 shows another embodiment of the present invention which may be used to place the first connecting plate 74 and two first links 78 in their substantially linear overlapping state to maintain the second row pitch P2 in the two rows of holding plates 50 in a reliable manner. In FIG. 9, the linkage 70 comprises a click mechanism 130 for maintaining the second row pitch P2. The dent mechanism 130 may include semispherical recesses 132a, 132b formed on the circumferential face of the guide rod 82 and spaced apart from each other by a distance equal to the stroke of the rod 82. On the other hand, a rotary segment 22 may have a recess 134 formed therein on the inner wall of the guide aperture 22a. The recess 134 receives a compression coil spring 136 which in turn receives a hardwearing ball 138 (e.g. steel ball) at the outer end thereof. In such an arrangement, the steel ball 138 is positioned within the upper recess 132a when the two rows of holding plates 50 are set at the first row pitch P1. Since the first row pitch P1 is unconditionally set by engaging the positioning pieces 58, the upper recess 132a may be formed as a relief which has a vertical size larger than the diameter of the steel ball 138. On the other hand, as the two rows of holding plates 50 are set at the second row pitch P2, the steel ball 138 will enter the lower recess 132b after the ball has been moved along the periphery of the guide rod 82. As a result, the upper limit of movement in the guide rod 82 can be determined by engaging the steel ball 138 in the lower recess 132b. In such a manner, the row pitch in the two rows of holding plates 50 will be set and maintained at the second row pitch P2.

As described, the present invention can be similarly applied to two-stage molding system. In such a case, the holding plates 50 require no lip molds 64, but only a function for holding the lip portion of each of performs 66 previously injection molded in any other stage at its ejectable state.

The present invention is not limited to such a type that the inner mold halves 92 in the two rows of blow molds are fixedly mounted opposite with each other. In the normal split mold, the row pitch in the two rows of blow molds is the second row pitch larger than those of the other stations. For example, after the temperature regulating step has been performed with the first row pitch, the row pitch in the two rows of holding plates 50 may be converted into the second row pitch at least before the clamping step in the blow molding station. After the clamping, blow molding and releasing steps have been complete, the row pitch in the two rows of holding plates 50 may be returned to the first row pitch before or after the ejecting step.

Figure 10:
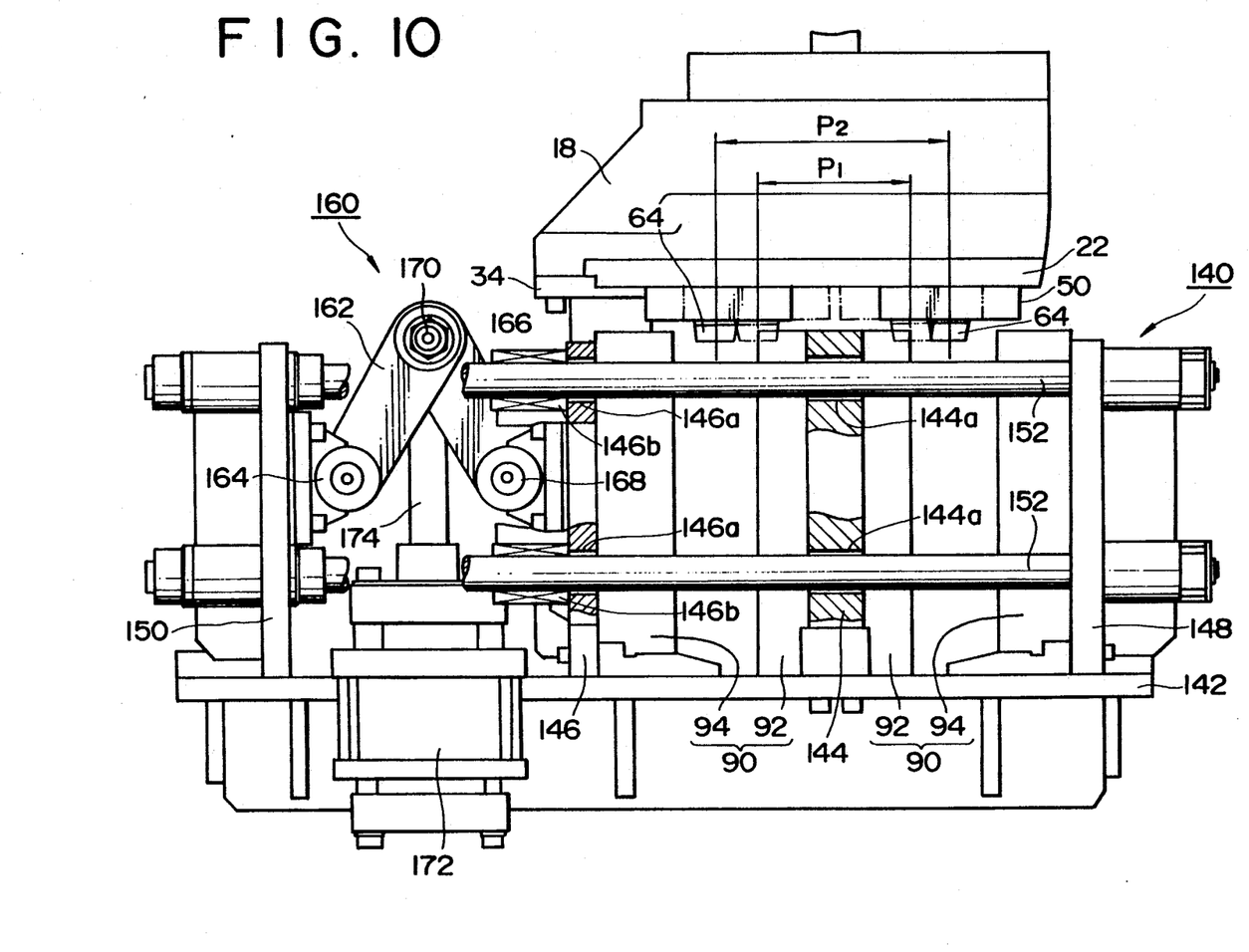
FIG. 10 is a schematic view of a mold clamping-/releasing device according to the present invention, the device being in its releasing position.
Figure 11:
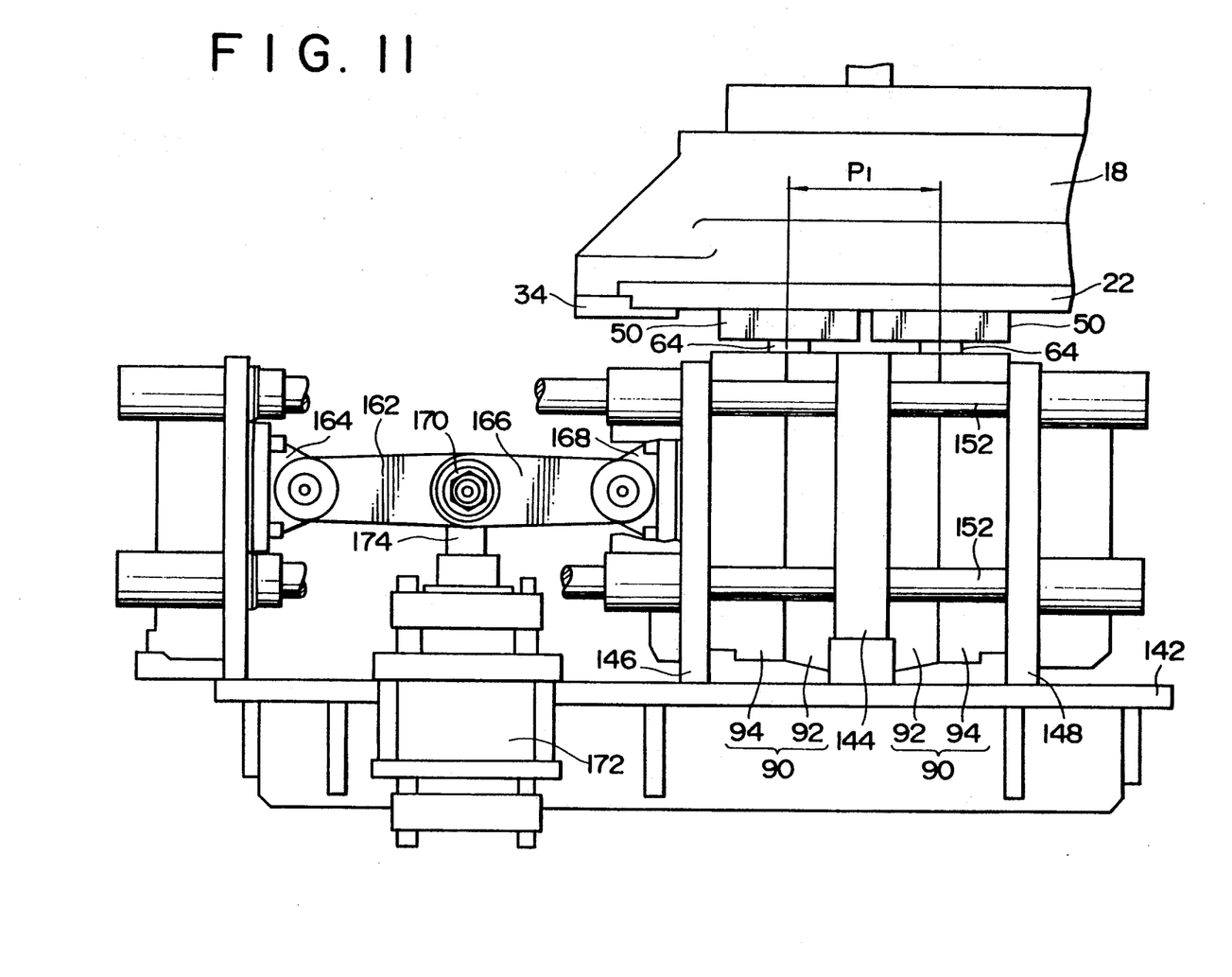
FIG. 11 is a schematic view of the device shown in FIG. 10 in its clamping position.

When two first mold halves 92 are fixedly mounted opposite with each other, it is preferred to use a clamping/releasing device 140 shown in FIGS. 10 and 11.

The clamping/releasing device 140 comprises a bottom plate 142 located below the upper base 18 which rotatably supports the rotary segments 22. The bottom plate 142 can be moved upwardly and downwardly by means of a lifting mechanism (not shown). The bottom plate 142 includes a stationary fixing plate 144 fixedly mounted thereon for fixing the two mold halves 92. The stationary fixing plate 144 may be omitted so that the mold halves 92 can be directed fixed opposite with each other. Alternatively, the mold halves 92 may be replaced by an integral mold unit including cavities formed therein at the opposite sides. On the opposite sides of the fixing plate 144, there are arranged first and second movable clamping plates 146, 148 each of which holds the corresponding one of two mold halves 94. A movable drive plate 150 is disposed outside the first clamping plate 146. Each of four clamp shafts 152 (only two shown) is fixedly mounted at one end on the drive plate 150 and extends through the first clamping plate 146 and fixing plate 144, with the other end being fixed to the second clamping plate 148. The fixing and first clamping plates 144, 146 include reliefs 144a, 146a formed therethrough to receive the clamp shafts 152. In order to assure that the first clamping plate 146 smoothly moves along the clamp shafts 152, a linear bearing 146b is fixedly mounted on the first clamping plate 146.

The clamping/releasing drive can be performed by an opening/closing mechanism 160 for changing the distance between the drive plate 150 and the first clamping plate 146. The opening/closing mechanism 160 comprises a first arm 162 pivotally connected at one end of the first hinge 164 in the drive plate 150; a second arm 166 pivotally connected at one end to the second hinge 168 of the first clamping plate 146; a rotary support shaft 170 pivotally connecting the other ends of the first and second arms 162, 166 to each other; and an air cylinder 172 as a drive source for driving the rotary support shaft 170 in a direction perpendicular to the clamp shafts 152, that is, in the vertical direction. The cylinder 172 includes an extendible rod 174, the outermost end of which is rotatably connected to the rotary support shaft 170. For example, the extendible rod 174 may be connected to a connecting plate on which two rotary support shafts 170 are mounted, as in the second support shaft 76 of the linkage 70.

As the extendible rod 174 is upwardly extended as shown in FIG. 10, the angle included between the first and second arms 162, 166 can be reduced to decrease the distance between the drive plate 150 and the first clamping plate 146. Therefore, the left-hand line of the second mold halves 94 as viewed in FIG. 10 are moved leftwardly relative to the left-hand line of the first stationary mold halves 92 to release the left-hand line of blow molds 90. At the same time, the rightward drive force of the drive plate 150 is transmitted to the second clamping plate 148 through the clamp shafts 152 to move the right-hand line of the second mold halves 94 rightwardly. Thus, the right-hand line of the blow molds 90 can be released.

The clamping operation is as shown in FIG. 11. When the extendible rod 174 of the cylinder 172 is moved downwardly, the first and second arm 162, 166 are overlapped on a straight line to move the first clamping plate 146 rightwardly and to move the second clamping plate 148 leftwardly until the first and second mold halves 92, 94 in each line of the blow molds 90 are brought into intimate contact with each other at their parting faces. Since the first and second arms 162, 166 are in the linear alignment, the clamping state can be firmly maintained.

In such an arrangement of the clamping/releasing device 140, only a single drive source may be located on one side of the two lines of blow molds 90 to save the necessary space. The rotary conveying type as shown in FIG. 8 can particularly save the necessary space to reduce the entire size of the apparatus since no drive is required on the side of rotational center.

Since the opening/closing mechanism maintains a clamping force when the first and second arms 162, 166 are in their linear alignment, a desired clamping force can be reliably provided by an air cylinder having a relatively small power, compared with the conventional hydraulic system as a drive.

I claim:
1. A blow molding apparatus comprising:
two rows of holding plates each for holding at least one preform;
supporting and conveying means for conveying said two rows of holding plates into a blow molding station while slidably supporting said holding plates so that the row pitch between said holding plate rows is variable;
two rows of blow molds arranged in said blow molding station corresponding to said two rows of holding plates, each row of said blow molds being positioned to blow mold the preforms into hollow articles; and
a linkage for changing and setting the row pitch of said holding plate rows,
said linkage comprising:
two first support shafts arranged respectively on the opposite end faces of the two rows of holding plates in a direction perpendicular to the direction of said pitch;
two first links each rotatably supported at one end around the corresponding one of said first support shafts; and
two second support shafts each for rotatably supporting the other end of the corresponding one of said first links in a coaxial or non-coaxial manner, whereby the row pitch of said holding plate rows can be changed by the vertical movement of said second support shafts.

2. A blow molding apparatus as defined in claim 1, further comprising biasing means for biasing said two rows of holding plates to decrease the row pitch into minimum and wherein the row pitch in said two rows of holding plates is maintained maximum when said two first links are placed on a substantially straight line.

3. A blow molding apparatus as defined in claim 2, further comprising a vertically and upwardly extending guide rod movable integrally with said second support shaft and a guide aperture formed through said supporting and conveying means for guiding said guide rod in the vertical direction.

4. A blow molding apparatus as defined in claim 3, further comprising positioning means for maintaining the height of said guide rod when said two rows of holding plates are set at the maximum row pitch.

5. A blow molding apparatus as defined in claim 1 wherein said supporting and conveying means conveys said two rows of holding plates into said blow molding station while maintaining the decreased row pitch and wherein said linkage for changing and setting the row pitch opens or closes said two first links in association with the clamping or releasing operation of said blow molds in said blow molding station.

6. A blow molding apparatus as defined in claim 5 wherein said supporting conveying means conveys said two rows of holding plates from said blow molding station to the subsequent or ejecting station while maintaining the increased row pitch and wherein said ejecting station comprises a pitch changing mechanism for changing the increased row pitch of said two rows of holding plates to the decreased row pitch after said hollow articles have been ejected out of said two rows of holding plates.

7. A blow molding apparatus as defined in claim 6, further comprising a vertically and upwardly extending guide rod movable integrally with said second support shaft and a guide aperture formed through said supporting and conveying means for guiding said guide rod in the vertical direction and wherein said pitch changing mechanism in said ejecting station downwardly moves said guide rod upwardly extended through said aperture to decrease the row pitch in said two rows of holding plates.

8. A blow molding apparatus as defined in claim 7, further comprising positioning means for maintaining the height of said guide rod when said two rows of holding plates are set at the maximum row pitch.

9. A blow molding apparatus as defined in claim 1, at least comprising an injection molding station for injection molding said preforms to be conveyed into said blow molding station, said blow molding station and an ejecting station for ejecting said hollow articles blow molded in said blow molding station and wherein said supporting and conveying means is a rotary disc for supporting said two rows of holding plates at positions corresponding to said stations and for intermittently conveying said two rows of holding plates through the respective stations.

10. A blow molding apparatus as defined in claim 1 wherein said two rows of blow molds comprises two first mold halves fixedly mounted opposite with each other and two second mold halves each arranged opposite to the corresponding first mold half and movable toward and away from the first mold half and wherein said two rows of blow molds comprise a row pitch changing and driving linkage for raising the second support shafts in association with the opening of the second mold halves, the row pitch changing and driving linkage comprising two third support shafts movable with the two second mold halves, two second links each rotatably supported at one end around the corresponding one of the third support shafts and fourth support shafts rotatably supporting the other end of the corresponding second links in a coaxial or non-coaxial manner, whereby when the two second mold halves are opened, the fourth support shafts is raised to raise the second support shafts and the row pitch in the two rows of holding plates can be increased.

11. A blow molding apparatus as defined in claim 10 wherein said supporting and conveying means conveys said two rows of holding plates from said blow molding station to the subsequent or ejecting station while maintaining the increased row pitch and wherein said ejecting station comprises a pitch changing mechanism for changing the increased row pitch of said two rows of holding plates to the decreased row pitch after said hollow articles have been ejected out of said two rows of holding plates.

12. A blow molding apparatus as defined in claim 11 further comprising a vertically and upwardly extending guide rod movable integrally with said second support shaft and a guide aperture formed through said supporting and conveying means for guiding said guide rod in the vertical direction and wherein said pitch changing mechanism in said ejecting station downwardly moves said guide rod upwardly extended through said aperture to decrease the row pitch in said two rows of holding plates.

13. A blow molding apparatus as defined in claim 12, further comprising positioning means for maintaining the height of said guide rod when said two rows of holding plates are set at the maximum row pitch.

14. A blow molding apparatus as defined in claim 10, at least comprising an injection molding station for injection molding said preforms to be conveyed into said blow molding station, said blow molding station and an ejecting station for ejecting said hollow articles blow molded in said blow molding station and wherein said supporting and conveying means is a rotary disc for supporting said two rows of holding plates at positions corresponding to said stations and for intermittently conveying said two rows of holding plates through the respective stations.

15. A blow molding apparatus comprising two rows of holding plates each holding at least one preform; supporting and conveying means for conveying said two rows of holding plates into a blow molding station while slidably supporting said two rows of holding plates so that the row pitch between said holding plate rows will be variable; two rows of blow molds located in said blow molding station at positions corresponding to said two rows of holding plates and positioned to blow mold said performs into hollow articles; and a clamping/releasing device for opening and closing said two rows of blow molds, said two rows of blow molds being formed by two first mold halves fixedly mounted opposite to each other and two second mold halves each arranged opposite to the corresponding first mold half and movable toward and away from the first mold half, said clamping/releasing device comprising first and second clamping plates each fixedly mounted on the respective one of the two second mold halves on the opposite sides of the two first mold halves fixedly arranged opposite to each other; a movable drive plate disposed outside the first clamping plate; a clamp shaft fixedly mounted at one end on said drive plate, the other end of said clamp shaft extending through said first clamping plate and fixedly connected to the second clamping plate; and an opening/closing drive mechanism for driving said drive plate and said first clamping plate to change the distance therebetween and to open and close the first and second clamping plates.

16. A blow molding apparatus as defined in claim 15 wherein said opening/closing drive mechanism comprises a first arm pivotally connected at one end to said drive plate; a second arm pivotally connected at one end to said first clamping plate; a rotary support shaft pivotally connected at the other ends of said first and second arms to each other in a coaxial or non-coaxial manner; and a drive source for driving said rotary support shaft in a direction perpendicular to said clamp shaft, whereby said two rows of blow molds can be maintained clamped when said first and second arms are on a substantially straight line.

17. A blow molding apparatus as defined in claim 16, at least comprising an injection molding station for injection molding said preforms to be conveyed into said blow molding station, said blow molding station and an ejecting station for ejecting said hollow articles blow molded in said blow molding station and wherein said supporting and conveying means is a rotary disc for supporting said two rows of holding plates at positions corresponding to said stations and for intermittently conveying said two rows of holding plates through the respective stations and wherein said drive source is disposed radially and outwardly of said rotary disc.

18. A blow molding apparatus as defined in claim 16 wherein said drive source is an air cylinder.

19. A blow molding apparatus comprising:
   two rows of holding plates each for holding at least one preform;
   supporting and conveying means for conveying said two rows of holding plates into a blow molding station while slidably supporting said holding plates so that the row pitch between said holdings plate rows is variable;
   a row pitch changing and setting linkage for changing and setting the row pitch in said two rows of holding plates;
   two rows of blow molds comprising two first mold halves fixedly mounted opposite with each other and two second mold halves each arranged opposite to the corresponding first mold half and movable toward and away from the first mold half;
   a clamping/releasing device for opening and closing said second mold halves; and
   a row pitch changing and driving linkage for driving said row pitch changing and setting linkage in association with release of said second mold halves,
   said row pitch changing and setting linkage comprising:
   two first support shafts arranged respectively on the opposite end faces of the two rows of holding plates in a direction perpendicular to the direction of said pitch;
   two first links each rotatably supported at one end around the corresponding one of said first support shafts; and
   two second support shafts each for rotatably supporting the other end of the corresponding one of said first link in a coaxial or non-coaxial manner,
   said row pitch changing and driving linkage comprising:
   two third support shafts movable with said two second mold halves;
   two second links each pivotally connected at one end to the corresponding one of said two third support shafts in a coaxial or non-coaxial manner; and
   fourth support shafts pivotally supporting the other ends of said two second links in a coaxial or non-coaxial manner,
   said clamping/releasing device comprising:
   first and second clamping plates each fixedly mounted on the respective one of the two second mold halves on the opposite sides of the two first mold halves fixedly arranged opposite to each other;
   a drive plate disposed outside the first clamping plate;
   a clamp shaft fixedly mounted at one end on said drive plate, the other end of said clamp shaft extending through said first clamping plate and fixedly connected to the second clamping plate; and
   an opening/closing drive mechanism for driving said drive plate and first clamping plate to change the distance therebetween and to open and close the first and second clamping plates,
   whereby the opening motion of said two second mold halves upwardly moves said fourth support shafts to move said second support shafts upwardly and to increase the row pitch in said two rows of holding plates.

* * * * *